United States Patent [19]

Melies

[11] Patent Number: 5,421,929
[45] Date of Patent: Jun. 6, 1995

[54] ARRANGEMENT FOR PRESSING FLAT WORKPIECES

[75] Inventor: Wolfgang Melies, Rietberg, Germany

[73] Assignee: WM Wild Maschinen GmbH, Germany

[21] Appl. No.: 77,297

[22] Filed: Jun. 15, 1993

[30] Foreign Application Priority Data

Jun. 15, 1992 [DE] Germany .................. 9208020 U

[51] Int. Cl.⁶ .................. B32B 31/00; B27F 7/00
[52] U.S. Cl. .................. 156/154; 15/1.51;
15/104.16; 144/2 R; 144/329; 144/344; 156/93
[58] Field of Search .................. 15/1.5, 1.51, 3.16,
15/3.17, 104.001, 104.16; 156/94, 153, 154, 311,
583.5; 144/242 R, 2 R, 245 R, 245 A, 329, 344,
352

[56] References Cited

U.S. PATENT DOCUMENTS

| | | | |
|---|---|---|---|
| 2,720,248 | 10/1955 | Kipnis | 156/154 |
| 3,835,902 | 9/1974 | Elmendorf | |
| 3,914,817 | 10/1975 | Lindsay | |
| 4,257,834 | 3/1981 | Iida et al. | 144/344 |

FOREIGN PATENT DOCUMENTS

| | | |
|---|---|---|
| 62830 | 8/1913 | Austria |
| 490179 | 4/1919 | France |
| 869689 | 1/1953 | Germany |
| 1737379 | 1/1957 | Germany |
| 2057673 | 5/1972 | Germany |
| 3806700 | 9/1989 | Germany |
| 3843225 | 6/1990 | Germany |
| 3912314 | 10/1990 | Germany |
| 4015706 | 11/1991 | Germany |

OTHER PUBLICATIONS

Database WPI, Week 9210, Derwent Publications Ltd., London, GB; AN 92-075684 & JP-A-4 018 906 (Fuji Electric).
Patent Abstracts of Japan, vol. 11, No. 123 (M-581) 17. Apr. 1987 & JP-A-61 263 507 (Nippon Nektron).
European Search Report and annex.

Primary Examiner—W. Donald Bray
Attorney, Agent, or Firm—Pretty, Schroeder, Brueggemann & Clark

[57] ABSTRACT

An arrangement for pressing flat workpieces that includes first and second heatable pressure plates forming a continuous channel therebetween and movable toward each other. First and second transport and pressure belts are associated with the first and second pressure plates, respectively. Each belt is endless and movable through the continuous channel. At least one electrically conductive abrading device is disposed in the exit region of the first transport and pressure belt from the first pressure plate with the abrading device in contact with the first transport and pressure belt.

11 Claims, 1 Drawing Sheet

ARRANGEMENT FOR PRESSING FLAT WORKPIECES

BACKGROUND OF THE INVENTION

The invention concerns an arrangement for pressing flat workpieces, in particular, of wood, such as veneers. Such a device is, for example, known from German Offenlegungsschrift 39 12 314 and comprises an upper and a lower pressing plate, each of which can be heated and moved toward each other. Further, one upper and one lower transport belt and pressure belt respectively are provided. These two belts run through a continuous channel formed between the pressing plates and are designed as endless belts to be able to transport the workpieces.

With the prior art devices it can prove disadvantageous that the transport and pressure belts become electro- statically charged during operation. Moreover, it may happen that dirt particles collect in the interior of the endless belts, which particles come between the belt and the surface of the pressing plate during the pressing process and have a negative effect on the surface quality of the workpieces.

SUMMARY OF THE INVENTION

The object of the invention is to provide an arrangement of the type mentioned in the introduction, which avoids the disadvantages of the prior art with a simple design and with operationally reliable efficiency and, in particular, avoids the electrostatic charging of the transport and pressure belt.

According to the invention the object is achieved in that in the exit zone of the transport and pressure belt from the pressing plates, at least one electrically conductive abrading device is disposed, which is in contact with the transport and pressure belt.

The arrangement according to the invention distinguishes itself through a group of significant advantages. By means of the abrading device, it is possible to divert electrostatic charges without disrupting the continuous operation through the press. The abrading device is protected from damage since it is disposed inside the orbit of the transport and pressure belt. Reliable operation is thus assured, independently of the number, shape, and design of the workpieces to be pressed.

A preferred improvement of the invention provides that the abrading device comprises metal brushes. For one thing, these brushes represent a sure diversion of the electrostatic charge; for another, it is possible to remove dirt particles from the transport and pressure belt by means of these brushes.

Preferably, the abrading device extends over the entire width of the transport and pressure belt.

To assure a simple arrangement and installation of the abrading device, it can be advantageous if it comprises a metal support on which the brushes are attached, and which is mounted removably. The removable mounting is effected preferably on a rail which has an essentially C-shaped cross-section. Thus, the abrading device can be inserted or removed from the side without requiring any additional assembly or disassembly work.

The rails are preferably mounted on the side of the pressing plate, which has adequate space for their installation.

According to the invention, a plurality of abrading devices disposed parallel to each other can be provided. The abrading devices can be disposed at a diagonal or perpendicular to the transport direction of the transport and pressure belt.

In order to collect dirt particles which have been removed by the abrading device as well as possible abraded parts of the abrading device itself, provision is made to dispose a collection trough below the abrading device. Preferably, this can also be mounted removably on a rail which has a C-shaped cross-section.

BRIEF DESCRIPTION OF THE DRAWINGS

According to the invention, it is advantageous if the transport and pressure belt is designed as a mylar transport film.

In the following, the invention is described using an exemplary embodiment in conjunction with the drawing.

DETAILED DESCRIPTION OF THE PREFERRED EMBODIMENTS

Figure 1:
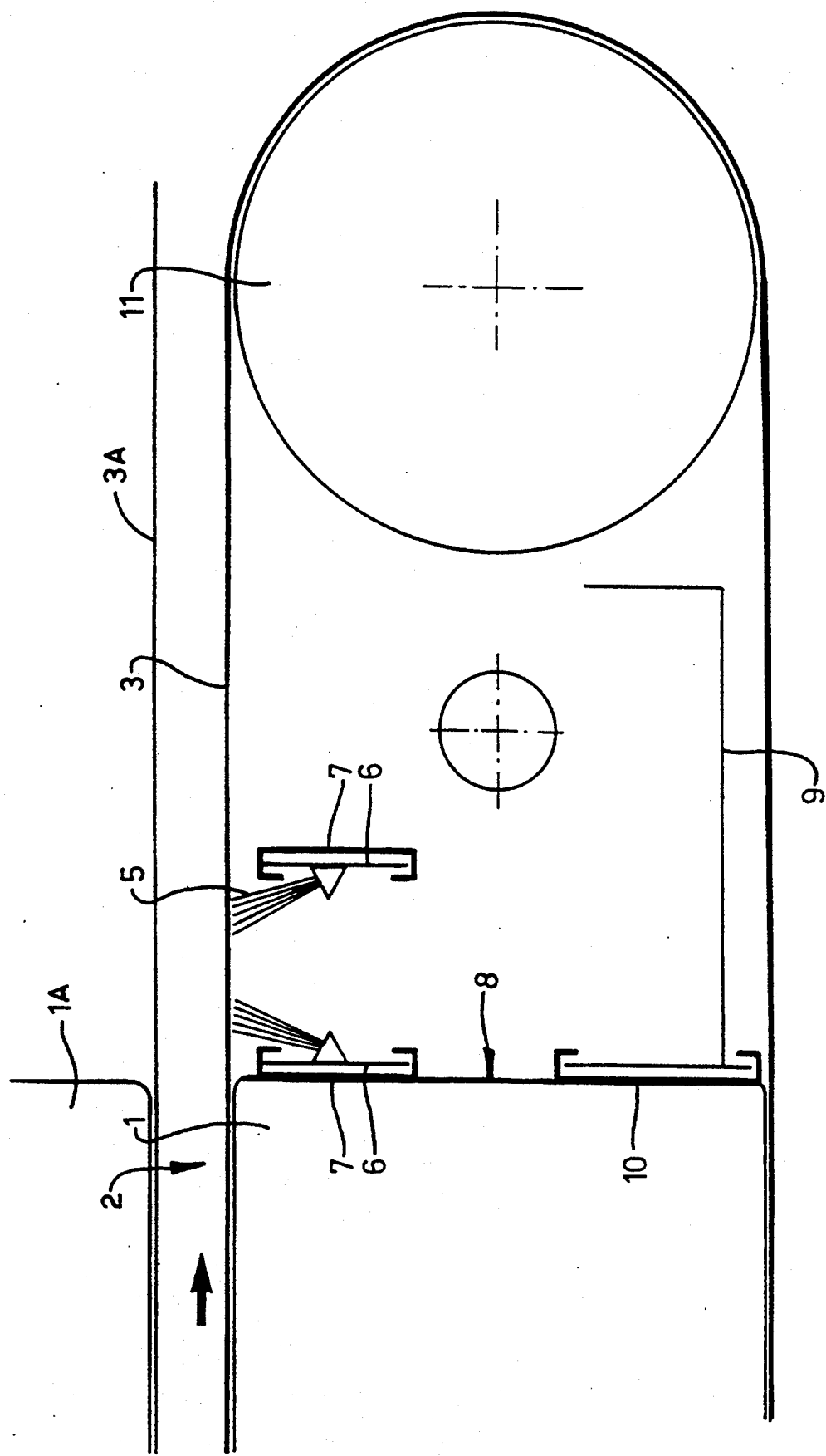
FIG. 1 depicts a schematic partial cross-sectional view of the arrangement according to the invention.

FIG. 1 depicts only a portion of the arrangement according to the invention, i.e., the exit portion of first and second transport and pressure belt 3, 3A from first and second pressing plates 1, 1A. The reference number 2 indicates a continuous channel which is formed between the first pressing plate 1 and the second pressing plate 1A lying above it. With regard to the entire design, reference is made to German Offenlegungsschrift 39 12 314, which is hereby incorporated by reference.

The transport and pressure belt 3 is guided over a roller 11 and returned on the underside of the pressure plate 1, such that an endless orbiting belt is formed.

On a flat back side 8 of the pressing plate 1, a rail 7 with an essentially C-shaped cross-section is mounted. A plate-shaped support 6, on which metal brushes or bristles 5 are attached to form an abrading device 4, is removably inserted in the inside open space of the rail. The bristles 5 slide on the inner surface of the transport and pressure belt 3 and thus result in both a static discharge and in removal of particles which cling to the transport and pressure belt 3.

The exemplary embodiment of FIG. 1 depicts two abrading devices 4 parallel to each other. Below the abrading devices 4, an additional rail 10 is mounted on the flat side 8 of the pressing plate 1, which likewise has a C-shaped cross-section. A collection trough 9, which serves to collect particles which drop from the abrading device 4, is removably suspended in this rail 10.

The invention is not restricted to the exemplary embodiment depicted; rather, there are within the framework of the invention many possibilities for variants and modifications.

It is understood that although only the lower pressing plate is depicted in FIG. 1, the associated upper pressing plate can also be provided with a corresponding abrading device.

In summary, the following must be noted:

The invention concerns an arrangement for pressing flat workpieces, in particular, of wood, such as veneers. The arrangement comprises an upper and a lower heatable pressing plate (1), around which a transport and pressure belt (3) respectively circulate. To divert electrostatic charges and to clean the transport and pressure belt, provision is made that at least one electrically conductive abrading device (4), which is in contact with the transport and pressure belt (3), is disposed in the exit region of the transport and pressure belt (3) from the pressing plate (1).

I claim:

1. An arrangement for pressing flat workpieces, comprising:
    first and second heatable pressure plates forming a continuous channel therebetween and movable toward each other;
    first and second transport and pressure belts associated with the first and second pressure plates, respectively, each belt endless and movable through the continuous channel; and
    at least one electrically conductive abrading device disposed in the exit region of the first transport and pressure belt from the first pressure plate, the abrading device in contact with the first transport and pressure belt.

2. The arrangement according to claim 1, wherein the abrading device comprises metal brushes.

3. The arrangement according to claim 2, wherein the abrading device extends over the entire width of the first transport and pressure belt.

4. The arrangement according to claim 2, wherein the abrading device further comprises a metal support on which the brushes are attached.

5. The arrangement according to claim 4, wherein the support is essentially in the shape of a plate and is mounted in a rail with a C-shaped cross-section.

6. The arrangement according to claim 5, wherein the rail is mounted on a flat side (8) of the first pressure plate.

7. The arrangement according to claim 1, wherein a plurality of abrading devices (4) are provided parallel to each other.

8. The arrangement according to claim 1, wherein the abrading device is disposed perpendicular to the transport direction of the first transport and pressure belt.

9. The arrangement according to claim 1, further comprising a collection trough disposed below the abrading device.

10. The arrangement according to claim 9, wherein the collection trough is removably mounted in a rail with a C-shaped cross-section.

11. The arrangement according to claim 1, wherein the transport and pressure belt is in the form of a mylar transport film.

* * * * *